T. B. DOOLITTLE.

Lamp Shade.

No. 3,625.

Reissued Aug. 31, 1869.

Witnesses:

A. J. Cox.

Edward Gyrop.

Inventor:

T. B. Doolittle.

By Atty.

John Tritle.

N. PETERS, Photo-Lithographer, Washington, D. C.

United States Patent Office.

GEORGE DOOLITTLE AND GEORGE H. DIMOND, OF BRIDGEPORT, AND THOMAS WALLACE, JR., OF ANSONIA, CONNECTICUT, ASSIGNEES, BY MESNE ASSIGNMENTS, OF T. B. DOOLITTLE.

*Letters Patent No.* 75,390, *dated March* 10, 1868; *reissue No.* 3,625, *dated August* 31, 1869.

IMPROVEMENT IN LAMP-SHADES.

The Schedule referred to in these Letters Patent and making part of the same.

*To all whom it may concern:*

Be it known that T. B. DOOLITTLE, of Bridgeport, of Fairfield county, in the State of Connecticut, did invent certain new and useful "Improvements in Lamp-Shades," and that the following is a full and exact description thereof, reference being had to the accompanying drawings, making part of this application.

This invention relates to certain new and useful improvements in that kind of lamp-shades which is intended and adapted to be placed upon and sustained by the ordinary glass chimney of a lamp, and has for its main object to supply the want of an efficient, cheap, and durable shade and reflector, adapted to be used on the chimney of common kerosene-lamps; and to this end, The invention consists in making a lamp-shade of a corrugated, or crimped sheet of thin brass or other suitable metal, and providing it with a spring or springs, at or near its upper edge, so as to be self-adjusting to the chimneys of lamps, as will be hereinafter more fully explained; and The invention further consists in the employment, in combination with a lamp-shade, of a holder-spring or springs, such as hereinafter more fully specified, arranged at or near the upper edge of the shade, and adapted to clasp the chimney of a lamp and retain the shade thereon, all as will be presently more fully explained; and The invention further consists in forming a metallic shade, so as to be yielding or expansible, and providing it with projecting bearing-points, or teats, to rest in contact with the chimney, and hold the upper portion of the shade sufficiently far from the chimney to prevent the shade getting too hot, all as will be presently more fully described.

To enable those skilled in the art to make and use the invention, we will proceed to describe the construction and operation of the several features of the said improvements, referring by letters to the accompanying drawings, in which—

In the several figures, the same letters of reference denote the same parts.

A is the lamp-chimney, and

Figure 1:
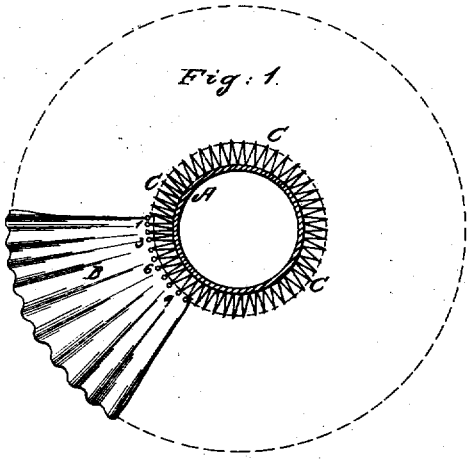
Figure 1 is a top view of one of the new metallic lamp-shades, shown as applied to the chimney of a "sun-burner" kerosene lamp.

B, the shade, which it is proposed to make of thin sheet-brass, in about the shape seen in the drawings, with its top opening sufficiently large to permit the accommodation within it of the chimney A, as shown.

Figure 2:
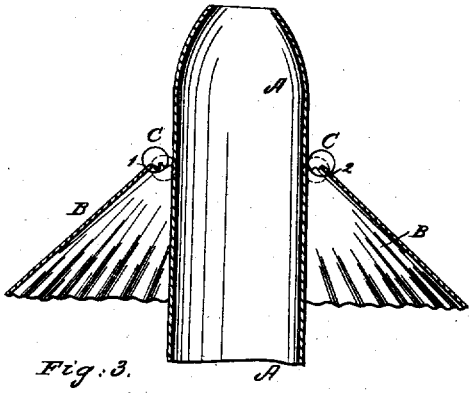
Figure 2 is a vertical section of the same.

C is a spiral spring, arranged at the top edge of the shade B, being run into holes 1, 2, 3, &c., made near the edge of shade B, as clearly seen at figs. 1 and 2.

This spring-roll or spiral coil C surrounds and clings to the chimney A, and holds the shade thereon at any desired point or elevation.

Figure 3:
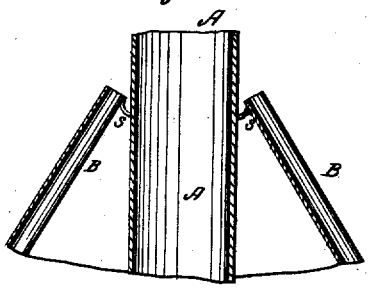
Figure 3 is a vertical section of another shade and chimney, showing the third feature of my invention.
Figure 4:
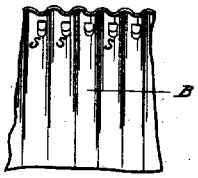
Figure 4 is a partial inside view of shade, illustrating more particularly the bearing teats.

At figs. 3 and 4, the shade B is made with a series of inwardly-projecting teats, *s s s*, near its top edge, which bear against the chimney A, the shade B in this case being retained on the chimney by its own spring or elasticity, of which it has a sufficiency, in consequence of being made, as shown and described, of thin sheet-brass, corrugated, or crimped in the manner illustrated.

The object and advantage of the teats *s* (which are formed by simply striking up projections with a die) are to hold the upper edge of the shade B far enough away from the chimney to permit a free circulation of air up around the outside of the latter, and to avoid the liability of the shade to get too hot, as it would if it rested completely in contact with the glass chimney of the lamp at its upper edge.

The size, proportion, and flare of the shade and its corrugations may, of course, be varied at pleasure, although it will be found advisable, in constructing shades to be used without any spring C, to have the flare, or taper sufficient and the corrugations fine enough, and extended to the extreme edge of the sheet, to insure a proper amount of spring, or expansive and contractive capability to the shade, to insure its spreading around on and clinging to the chimney.

It is proposed to prepare the under surface of the metallic shade suitably to make it perform the office of a good reflector, as well as shade, and it will be seen that a shade constructed according to either of the modes herein set forth may be very readily adjusted (vertically) on the ordinary straight (or nearly straight) chimney, and that it will be exceedingly light and convenient for use, while at the same time it will be extremely simple, durable, and economic of manufacture.

It will be understood that an effective and most desirable shade and reflector may be manufactured by simply forming the shade of thin sheet-brass, so corrugated, or crimped as to have sufficient elasticity, or spring to it to clasp and retain itself on the chimney without using either of the other two features of the said improvements, viz, the retaining-spring device or the bearing-teats, but it may be found more advantageous to use the teats *s*, when no spring is employed; and although a sufficient amount of expansive capacity or spring may be induced in the shade itself, if formed of the right material, of proper thickness, and suitably corrugated, it is proposed to generally employ the spiral spring C, or its equivalent, as by the use of it in connection with the shade B, as shown, the opening in the top of the shade may be much larger and more yielding, or a greater scope of adjustment may be obtained, so that the shade can be used on chimneys varying considerably in their diameter.

It will be seen, that in the use of the spring C on the shade B, the former will roll over and spread considerably, to permit the insertion of a chimney quite as large as the opening in the top of the shade, and that if the shade B be forced down over a chimney even larger than the said opening, the spring will yield first to its full extent, and then the shade itself will yield, and by its own elasticity cling to the chimney.

It will be understood, that in lieu of the continuous spiral spring, running entirely around the top edge of the shade, disconnected separate pieces of spiral spring may be placed at intervals around the edge of the shade, and so adapted as to roll or yield in the manner described and shown of spring C, or some other form of spring-device may be applied to the top edge of the shade, but the continuous spring is deemed good, and it is readily attached and secured so as to yield freely when spread by the insertion of the chimney, as illustrated by the positions shown by red and black lines at fig. 2.

It may be remarked, that by having the sheet-metal composing the shade corrugated from edge to edge, the shade is rendered capable of being folded, packed, or even distorted in shape without detriment, as it will always spring back to its proper shape; and it will be understood that the spiral clasp, or spring shade-holder C may be applied with great advantage to the edge of other shades than the kind made in accordance with the other features of the invention herein described; and it will be readily seen that this feature of the said invention (the coil-spring clasp) can be applied to the top edge of any paper or other shade suitably made, and thus be used advantageously, without using the other features.

It is therefore wished to be understood that the claim of invention in respect to the spring-clasp is not limited to its use in connection only with the other features of the invention, though it has been practised so far in that connection.

It will be understood, that by forming the body of sheet-metal, as described, a shade is produced which is efficient, durable, light, and economic of manufacture, while by corrugating such metallic body, it is rendered capable of affording more reflecting-surface, and is also made stronger and to maintain its shape, or contour with less weight of metal.

What is claimed herein as new, and desired to be secured by Letters Patent, is—

1. As an article of manufacture, a corrugated metallic shade for lamps, combined with a spring or springs, at or near the upper edge, to be self-adapting to the chimney, substantially as described.

2. The employment, in combination with a shade or reflector, of a spiral, or coil spring or springs, arranged in the upper edge of the shade, so as to roll over or spring back, substantially as described, for the purpose set forth.

3. Forming a corrugated, or crimped metallic shade, so as to be yielding at its upper edge, and providing it with projecting teats, or lips *s s*, substantially as described, for the purpose set forth.

In testimony whereof, we have hereunto set our hands and seals, this 1st day of June, 1869.

GEORGE H. DIMOND. [L. S.]
GEORGE DOOLITTLE. [L. S.]
THOS. WALLACE. JR. [L. S.]

Witnesses to GEORGE H. DIMOND and GEORGE DOOLITTLE:
WM. E. BARNETT,
SAM. B. SUMNER.

Witnesses to THOMAS WALLACE, JR.
A. J. HINE,
CHAS. H. PINE.